US011393429B2

(12) United States Patent

Chen et al.

(10) Patent No.: US 11,393,429 B2
(45) Date of Patent: Jul. 19, 2022

(54) DISPLAY DEVICE AND COLOR ADJUSTING METHOD

(71) Applicant: QISDA CORPORATION, Taoyuan (TW)

(72) Inventors: Feng-Lin Chen, Taoyuan (TW); Chun-Chang Wu, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 17/155,112

(22) Filed: Jan. 22, 2021

(65) Prior Publication Data

US 2021/0264874 A1 Aug. 26, 2021

(30) Foreign Application Priority Data

Feb. 24, 2020 (TW) ................................ 109105852

(51) Int. Cl.

| | |
|---|---|
| ***G09G 5/02*** | (2006.01) |
| ***G09G 5/10*** | (2006.01) |
| ***H04N 1/60*** | (2006.01) |
| ***H04N 5/57*** | (2006.01) |
| ***H04N 9/64*** | (2006.01) |

(52) U.S. Cl.

CPC ....... *G09G 5/02* (2013.01); *G09G 2320/0626* (2013.01); *G09G 2320/0666* (2013.01); *G09G 2340/06* (2013.01); *G09G 2354/00* (2013.01)

(58) Field of Classification Search

CPC combination set(s) only.

See application file for complete search history.

(56) References Cited

U.S. PATENT DOCUMENTS

| | | | | |
|---|---|---|---|---|
| 6,507,667 | B1 * | 1/2003 | Hsieh | H04N 1/6075 348/223.1 |
| 2011/0157212 | A1 | 6/2011 | Zhang | |
| 2013/0336583 | A1 * | 12/2013 | Ernst | G06T 7/80 382/165 |
| 2014/0152687 | A1 | 6/2014 | Liu | |
| 2014/0333660 | A1 * | 11/2014 | Ballestad | G06K 9/6202 345/593 |
| 2015/0262550 | A1 | 9/2015 | Kawaguchi | |
| 2016/0240125 | A1 * | 8/2016 | Sridharan | G09G 5/06 |
| 2020/0310100 | A1 * | 10/2020 | Ozcan | G03H 1/0866 |

FOREIGN PATENT DOCUMENTS

| | | |
|---|---|---|
| CN | 106507082 A | 3/2017 |
| CN | 110738957 A | 1/2020 |

* cited by examiner

*Primary Examiner* — Wesner Sajous

(57) ABSTRACT

A display device includes a storage unit, a display unit and a processing unit. The storage unit stores an original coordinate of a reference point and a color parameter under a color space, wherein the color space has been processed by color calibration in advance. The display unit displays an adjusting interface. The adjusting interface is configured to shift the reference point to generate a shift coordinate of the reference point. The processing unit is coupled to the storage unit and the display unit. The processing unit obtains a color transformation matrix according to the original coordinate of the reference point, the shift coordinate of the reference point and the color parameter. The processing unit adjusts three output percentages of RGB by the color transformation matrix.

12 Claims, 5 Drawing Sheets

DISPLAY DEVICE AND COLOR ADJUSTING METHOD

BACKGROUND OF THE INVENTION

1. Field of the Invention

The invention relates to a display device and a color adjusting method and, more particularly, to a display device and a color adjusting method allowing a user to adjust color in real-time.

2. Description of the Prior Art

A high definition display device has been widely used to obtain high resolution. The high definition display device requires high precision of color. At present, a colorimeter used for calibrating color of the display device usually uses CIE1931 coordinate system to measure chrominance of the display device. However, CIE1931 coordinate system is not suitable for performing comparison and calculation for color vision of human eyes. Therefore, metameric colors may still exist between different display devices even if color calibration has been performed for the display devices, such that a user needs to adjust color by himself/herself to obtain identical color output. In the prior art, the user adjusts color by adjusting gain and/or offset of RGB. However, the aforesaid adjusting manner will affect brightness, color gamut and gamma of the display device at the same time and the operation thereof is inconvenient.

SUMMARY OF THE INVENTION

An objective of the invention is to provide a display device and a color adjusting method allowing a user to adjust color in real-time, so as to solve the aforesaid problems.

According to an embodiment of the invention, a display device comprises a storage unit, a display unit and a processing unit. The storage unit stores an original coordinate of a reference point and a color parameter under a color space, wherein the color space has been processed by color calibration in advance. The display unit displays an adjusting interface. The adjusting interface is configured to shift the reference point to generate a shift coordinate of the reference point. The processing unit is coupled to the storage unit and the display unit. The processing unit obtains a color transformation matrix according to the original coordinate of the reference point, the shift coordinate of the reference point and the color parameter. The processing unit adjusts three output percentages of RGB by the color transformation matrix.

According to another embodiment of the invention, a color adjusting method is adapted to a display device. The color adjusting method comprises steps of the display device storing an original coordinate of a reference point and a color parameter under a color space, wherein the color space has been processed by color calibration in advance; the display device displaying an adjusting interface; shifting the reference point by the adjusting interface to generate a shift coordinate of the reference point; the display device obtaining a color transformation matrix according to the original coordinate of the reference point, the shift coordinate of the reference point and the color parameter; and the display device adjusting three output percentages of RGB by the color transformation matrix.

As mentioned in the above, when a user wants to adjust the current color of the display device, the user shifts the reference point by the adjusting interface. Then, the display device calculates the color transformation matrix automatically and adjusts three output percentages of RGB by the color transformation matrix, so as to update the current color to be a new color adjusted by the user in real-time. Since the color transformation matrix does not need to be calculated by an external color analyzer, the invention is very convenient for a common user.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
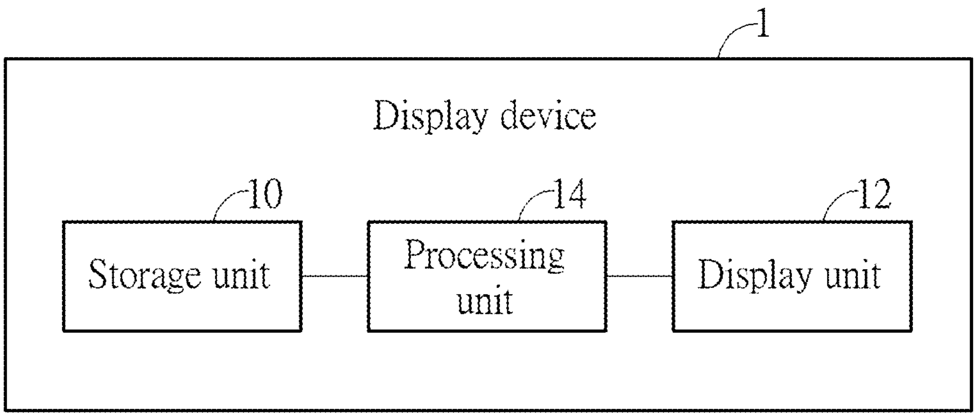
FIG. 1 is a functional block diagram illustrating a display device according to an embodiment of the invention.
Figure 2A:
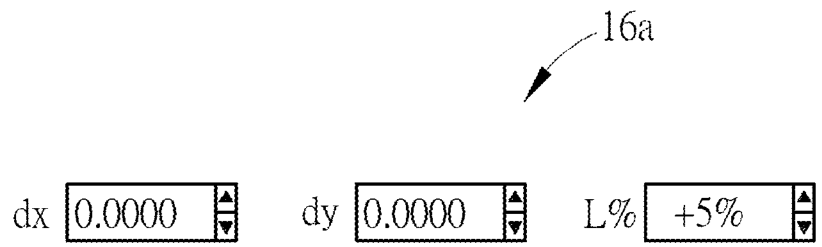
FIGS. 2A to 2I are schematic diagrams illustrating different adjusting interfaces according to different embodiments of the invention.
Figure 2B:
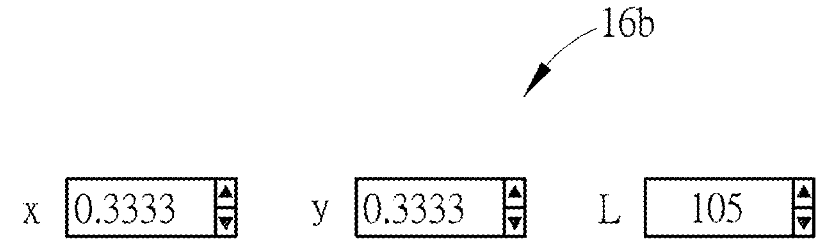
Figure 2C:
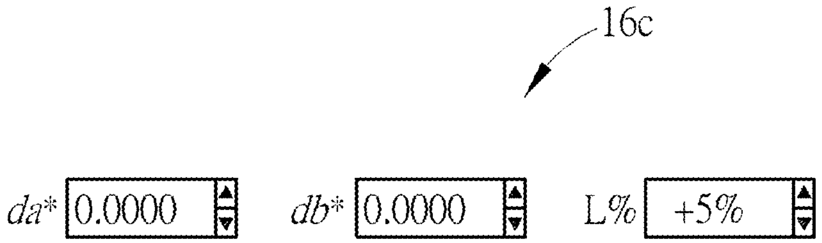
Figure 2D:
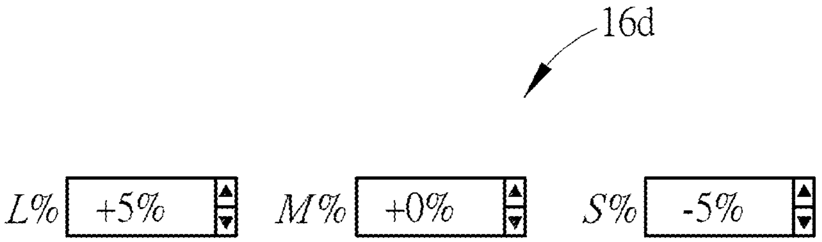
Figure 2E:
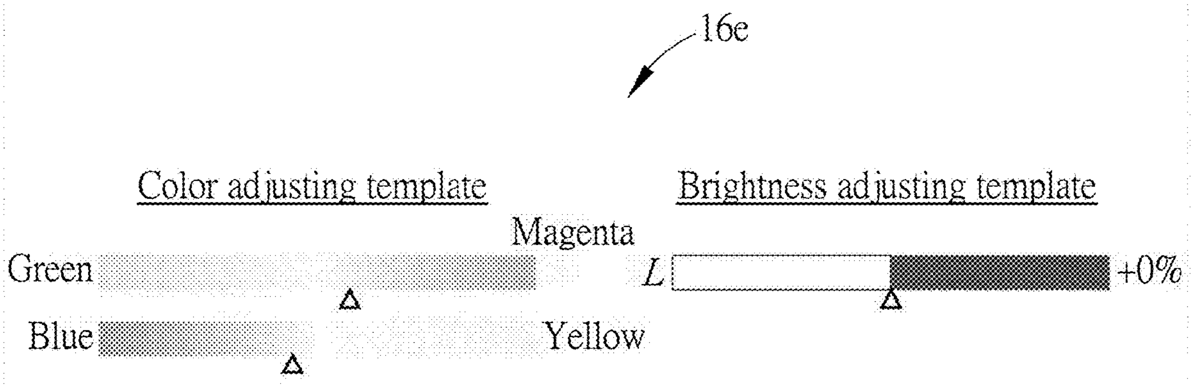
Figure 2F:
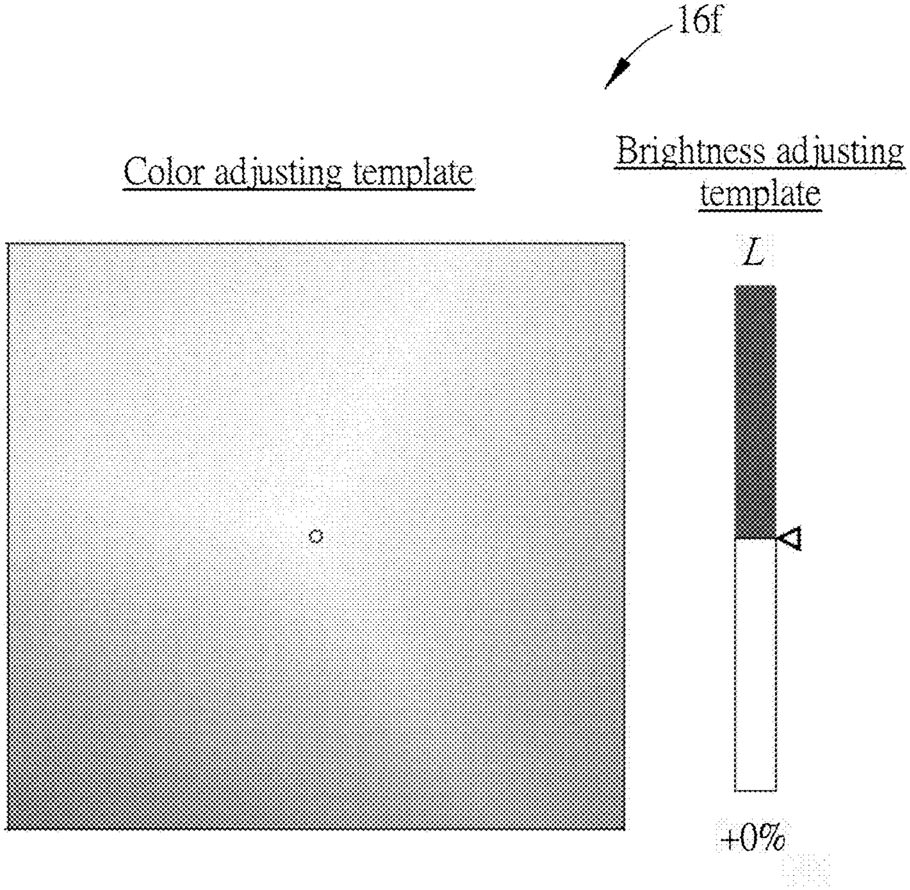
Figure 2G:
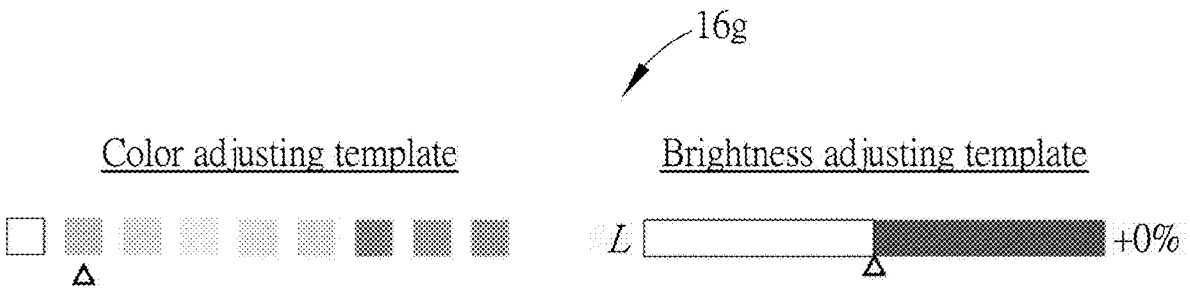
Figure 2H:
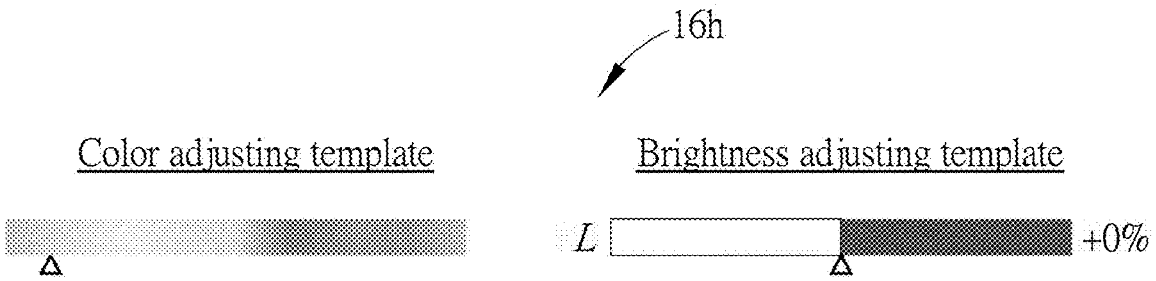
Figure 2I:
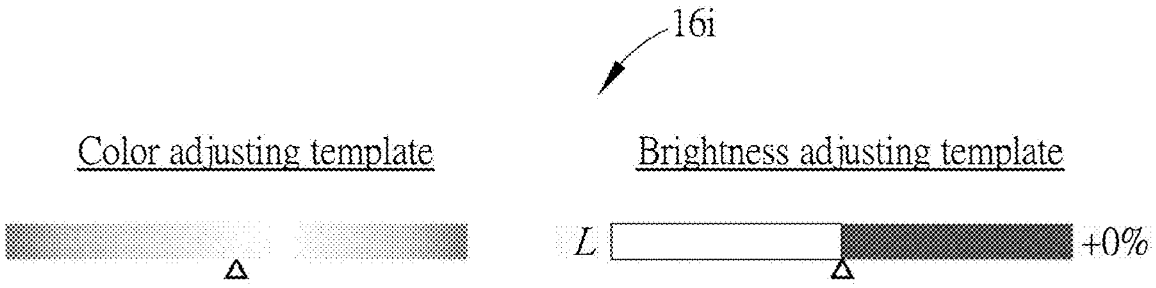

Referring to FIGS. 1 to 2I, FIG. 1 is a functional block diagram illustrating a display device 1 according to an embodiment of the invention and FIGS. 2A to 2I are schematic diagrams illustrating different adjusting interfaces 16*a*-16*i* according to different embodiments of the invention.

As shown in FIG. 1, the display device 1 comprises a storage unit 10, a display unit 12 and a processing unit 14, wherein the processing unit 14 is coupled to the storage unit 10 and the display unit 12. In practical applications, the storage unit 10 may be a memory or other data storage devices, the display unit 12 may be a display panel, and the processing unit 14 may be a processor or a controller with data processing function. In general, the display device 1 may be further equipped with some necessary hardware or software components for specific purposes, such as an input/output port, an application, a circuit board, a power supply, a communication module, etc., and it depends on practical applications.

The storage unit stores an original coordinate of a reference point and a color parameter under a color space, wherein the color space has been processed by color calibration in advance. In this embodiment, the aforesaid color space may be a linear color space, i.e. a three-axis coordinate system capable of performing linear transformation for matrix, such as CIE1931XYZ, CIE1931RGB, CIE2015XYZ, LMS color space, or other color space using three characteristic vectors $\{\bar{x}(\lambda),\bar{y}(\lambda),\bar{z}(\lambda)\}$ to depict spectrum $I(\lambda)$. Since the aforesaid color space has been processed by color calibration in advance, the aforesaid color space conforms to standard color gamut defined by international organization, such as sRGB, AdobeRGB, DCI-P3, BT.709, BT.2020, NTSC, Apple RGB, CIE1931RGB etc. and a color temperature of white conforms to a standard of D50, D55, D65, D75, D93, E, DCI-P3, 3000K-10000K of black body radiation curve, etc. Accordingly, color performance of WRGB may be represented by an RGB tristimulus matrix $$\begin{pmatrix} R_X & R_Y & R_Z \\ G_X & G_Y & G_Z \\ B_X & B_Y & B_Z \end{pmatrix}_{Original},$$

wherein X, Y or Z represents a component of a coordinate axis in the aforesaid color space.

In this embodiment, the display device 1 may provide a button (not shown) for triggering a color adjusting function. When a user wants to adjust the current color of the display device 1, the user may press the button. At this time, the display unit 12 displays an adjusting interface, as any one shown in FIGS. 2A to 2I. The adjusting interface is configured to shift the aforesaid reference point to generate a shift coordinate of the reference point. For further illustration, the user may shift the reference point by the adjusting interface to adjust the current color of the display device 1. After shifting the reference point, the processing unit 14 obtains a color transformation matrix according to the original coordinate of the reference point, the shift coordinate of the reference point and the color parameter. Then, the processing unit 14 adjusts three output percentages of RGB by the color transformation matrix, so as to update the current color to be a new color adjusted by the user in real-time.

In the following, the adjusting interfaces 16*a*-16*i* shown in FIGS. 2A-2I will be depicted first.

As shown in FIGS. 2A to 2D, the adjusting interfaces 16*a*-16*d* of the invention may be a two-dimensional adjusting interface or a three-dimensional adjusting interface and each of the adjusting interfaces 16*a*-16*d* may comprise a plurality of input fields.

The adjusting interface 16*a* shown in FIG. 2A is designed for CIE1931XYZ. The adjusting interface 16*a* may comprise three fields for the user to input shift vectors dx, dy and L % of the reference point. After the user inputs the shift vectors of the reference point, the processing unit 14 may generate the shift coordinate of the reference point according to the original coordinate of the reference point and the shift vectors. It should be noted that L represents brightness and is optional. When the adjusting interface 16*a* only comprises the fields of dx and dy, the adjusting interface 16*a* is a two-dimensional adjusting interface. When the adjusting interface 16*a* comprises the fields of dx, dy and L %, the adjusting interface 16*a* is a three-dimensional adjusting interface.

The adjusting interface 16*b* shown in FIG. 2B is also designed for CIE1931XYZ. The adjusting interface 16*b* may comprise three fields for the user to input shift coordinates x, y and L of the reference point. Accordingly, the user may input the shift coordinate of the reference point in the adjusting interface 16*b* directly. It should be noted that L represents brightness and is optional. When the adjusting interface 16*b* only comprises the fields of x and y, the adjusting interface 16*b* is a two-dimensional adjusting interface. When the adjusting interface 16*b* comprises the fields of x, y and L, the adjusting interface 16*b* is a three-dimensional adjusting interface.

The adjusting interface 16*c* shown in FIG. 2C is designed for CIE1976LAB. The adjusting interface 16*c* may comprise three fields for the user to input shift vectors da*, db* and L % of the reference point. After the user inputs the shift vectors of the reference point, the processing unit 14 may generate the shift coordinate of the reference point according to the original coordinate of the reference point and the shift vectors. It should be noted that L represents brightness and is optional. When the adjusting interface 16*c* only comprises the fields of da* and db*, the adjusting interface 16*c* is a two-dimensional adjusting interface. When the adjusting interface 16*c* comprises the fields of da*, db* and L %, the adjusting interface 16*c* is a three-dimensional adjusting interface.

The adjusting interface 16*d* shown in FIG. 2D is designed for LMS color space. The adjusting interface 16*d* may comprise three fields for the user to input shift vectors L %, M % and S % of the reference point. After the user inputs the shift vectors of the reference point, the processing unit 14 may generate the shift coordinate of the reference point according to the original coordinate of the reference point and the shift vectors. It should be noted that M is used to adjust brightness and is optional. When the adjusting interface 16*d* only comprises the fields of L % and S %, the adjusting interface 16*d* is a two-dimensional adjusting interface. When the adjusting interface 16*d* comprises the fields of L %, M % and S %, the adjusting interface 16*d* is a three-dimensional adjusting interface.

As shown in FIGS. 2E to 2I, the adjusting interfaces 16*e*-16*i* of the invention may be three-dimensional adjusting interfaces and each of the adjusting interfaces 16*e*-16*i* comprises a color adjusting template and a brightness adjusting template. As shown in FIG. 2E, the color adjusting template of the adjusting interface 16*e* may comprise two color adjusting bars. As shown in FIG. 2F, the color adjusting template of the adjusting interface 16*f* is a color pattern. As shown in FIG. 2G, the color adjusting template of the adjusting interface 16*g* comprises a plurality of discontinuous color blocks. As shown in FIG. 2H, the color adjusting template of the adjusting interface 16*h* is a color adjusting bar. As shown in FIG. 2I, the color adjusting template of the adjusting interface 16*i* is a color temperature adjusting bar. The user may operate the color adjusting template and the brightness adjusting template to adjust color and brightness of the reference point to input shift vectors of the reference point. After the user inputs the shift vectors of the reference point, the processing unit 14 may generate the shift coordinate of the reference point according to the original coordinate of the reference point and the shift vectors.

It should be noted that each of the adjusting interfaces 16*e*-16*i* may also be the color adjusting template only without the brightness adjusting template. At this time, each of the adjusting interfaces 16*e*-16*i* is a two-dimensional adjusting interface. When the adjusting interface is a two-dimensional adjusting interface, the user may operate the color adjusting template to adjust color of the reference point to input shift vectors of the reference point. After the user inputs the shift vectors of the reference point, the processing unit 14 may generate the shift coordinate of the reference point according to the original coordinate of the reference point and the shift vectors.

In an embodiment, the aforesaid color parameter may be color coordinates of WRGB, wherein W represents white, R represents red, G represents green, and B represents blue. At this time, the processing unit 14 may obtain an RGB tristimulus matrix according to the color coordinates of WRGB. Then, the processing unit 14 may obtain the color transformation matrix according to the original coordinate of the reference point, the shift coordinate of the reference point and the RGB tristimulus matrix.

According to an embodiment, the data of color coordinates (x, y, z) of WRGB may be shown in table 1 below. In this embodiment, the storage unit 10 may store the color coordinates (x, y) of WRGB shown in table 1 below and the color coordinate z may be calculated and obtained by 1-x-y.

As mentioned in the above, the color coordinates (x, y, z) of WRGB shown in table 1 have been processed by color calibration in advance.

TABLE 1

| | Color coordinate | | |
|---|---|---|---|
| | x | y | z |
| W | 0.3127 | 0.329 | 0.3583 |
| R | 0.64 | 0.33 | 0.03 |
| G | 0.3 | 0.6 | 0.1 |
| B | 0.15 | 0.06 | 0.79 |

The color coordinates (x, y, z) of RGB shown in table 1 may be represented by an RGB color gamut matrix $$\begin{pmatrix} R_x & R_y & R_z \\ G_x & G_y & G_z \\ B_x & B_y & B_z \end{pmatrix}_{Original}.$$

Then, the RGB color gamut matrix $$\begin{pmatrix} R_x & R_y & R_z \\ G_x & G_y & G_z \\ B_x & B_y & B_z \end{pmatrix}_{Original}$$

may be transformed into an RGB color gamut inverse matrix $$\begin{pmatrix} R_x & R_y & R_z \\ G_x & G_y & G_z \\ B_x & B_y & B_z \end{pmatrix}_{Original}^{-1}.$$

According to the data of table 1, $$\begin{pmatrix} R_x & R_y & R_z \\ G_x & G_y & G_z \\ B_x & B_y & B_z \end{pmatrix}_{Original}^{-1}$$

is $$\begin{pmatrix} 2.088353 & -1.15529 & 0.066934 \\ -0.99063 & 2.236055 & -0.24543 \\ -0.32129 & 0.049531 & 1.271754 \end{pmatrix}.$$

Furthermore, the color coordinate $(x\ y\ z)_W$ of W may be normalized by the color coordinate y of W to be $$\left(\frac{x}{y}\ 1\ \frac{z}{y}\right)_W,$$

wherein $$\left(\frac{x}{y}\ 1\ \frac{z}{y}\right)_W = (0.950456\ 1\ 1.089058).$$

Then, a composition coefficient $(r_W\ g_W\ b_W)$ of the color coordinate of W may be obtained by an equation 1 below, wherein $(r_W\ g_W\ b_W)$ is obtained by the normalized color coordinate $$\left(\frac{x}{y}\ 1\ \frac{z}{y}\right)_W$$

of W and the RGB color gamut inverse matrix $$\begin{pmatrix} R_x & R_y & R_z \\ G_x & G_y & G_z \\ B_x & B_y & B_z \end{pmatrix}_{Original}^{-1}.$$

$$(r_W\ g_W\ b_W) = \left(\frac{x}{y}\ 1\ \frac{z}{y}\right)_W * \begin{pmatrix} R_x & R_y & R_z \\ G_x & G_y & G_z \\ B_x & B_y & B_z \end{pmatrix}_{Original}^{-1}. \quad \text{Equation 1}$$

According to the equation 1, the composition coefficient $(r_W\ g_W\ b_W)$ of the color coordinate of W is 0.644361 1.191948 1.203205).

Then, the RGB tristimulus matrix $$\begin{pmatrix} R_X & R_Y & R_Z \\ G_X & G_Y & G_Z \\ B_X & B_Y & B_Z \end{pmatrix}_{Original}$$

may be obtained by an equation 2 below.

$$\begin{pmatrix} R_X & R_Y & R_Z \\ G_X & G_Y & G_Z \\ B_X & B_Y & B_Z \end{pmatrix}_{Original} = \begin{pmatrix} r_W R_x & r_W R_y & r_W R_z \\ g_W G_x & g_W G_y & g_W g_Z \\ b_W B_x & b_W B_y & b_W B_z \end{pmatrix}_{Original}. \quad \text{Equation 2}$$

According to the equation 2, the data of the RGB tristimulus matrix $$\begin{pmatrix} R_X & R_Y & R_Z \\ G_X & G_Y & G_Z \\ B_X & B_Y & B_Z \end{pmatrix}_{Original}$$

may be shown in table 2 below.

TABLE 2

| | X | Y | Z |
|---|---|---|---|
| R | 0.4124 | 0.2126 | 0.0193 |
| G | 0.3576 | 0.7152 | 0.1192 |
| B | 0.1805 | 0.0722 | 0.9505 |

In another embodiment, the aforesaid color parameter may also be the RGB tristimulus matrix. In other words, the invention may calculate the RGB tristimulus matrix in advance according to the aforesaid manner and then store the RGB tristimulus matrix in the storage unit 10.

In this embodiment, the aforesaid reference point may be any point in the color space (e.g. white point or other color points). The original coordinate of the reference point may be obtained by an equation 3 below.

$$(X\ Y\ Z)_{Original} = (r\ g\ b)_{Original} * \begin{pmatrix} R_X & R_Y & R_Z \\ G_X & G_Y & G_Z \\ B_X & B_Y & B_Z \end{pmatrix}_{Original}. \quad \text{Equation 3}$$

In the equation 3, $(X\ Y\ Z)_{Original}$ represents the original coordinate of the reference point, $(r\ g\ b)_{Original}$ represents three output percentages of RGB of the reference point, and $$\begin{pmatrix} R_X & R_Y & R_Z \\ G_X & G_Y & G_Z \\ B_X & B_Y & B_Z \end{pmatrix}_{Original}$$

represents the RGB tristimulus matrix.

It is assumed that the output percentages $(r\ g\ b)_{Original}$ of RGB of the reference point is (0.8 0.9 1). According to the equation 3, the original coordinate $(X\ Y\ Z)_{Original}$ of the reference point is (118322 0.8860 1.0733).

Then, the color transformation matrix may be obtained by equations 4 to 6 below.

$$(X\ Y\ Z)_{Shift} = (X\ Y\ Z)_{Original} * M_T. \quad \text{Equation 4}$$

$$M_T = \begin{pmatrix} X_{Shift}/X_{Originalt} & 0 & 0 \\ 0 & Y_{Shift}/Y_{Originalt} & 0 \\ 0 & 0 & Z_{Shift}/Z_{Originalt} \end{pmatrix}. \quad \text{Equation 5}$$

$$M_C = \begin{pmatrix} R_X & R_Y & R_Z \\ G_X & G_Y & G_Z \\ B_X & B_Y & B_Z \end{pmatrix}_{Original} * M_T * \begin{pmatrix} R_X & R_Y & R_Z \\ G_X & G_Y & G_Z \\ B_X & B_Y & B_Z \end{pmatrix}_{Orignal}^{-1}. \quad \text{Equation 6}$$

In the equations 4 to 6, $(X\ Y\ Z)_{Original}$ represents the original coordinate of the reference point, $(X\ Y\ Z)_{Shift}$ represents the shift coordinate of the reference point, $M_T$ represents a coordinate transformation matrix, $$\begin{pmatrix} R_X & R_Y & R_Z \\ G_X & G_Y & G_Z \\ B_X & B_Y & B_Z \end{pmatrix}_{Original}$$

represents the RGB tristimulus matrix, and $M_C$ represents the color transformation matrix.

It is assumed that the color coordinate (0.2981 0.3174) of the reference point is shifted to (0.3 0.32) by the aforesaid two-dimensional adjusting interface, wherein the brightness is not adjusted. At this time, the shift coordinate $(X\ Y\ Z)_{Shift}$ of the reference point may be obtained by an equation 7 below.

$$\begin{cases} x = \dfrac{X}{(X+Y+Z)} \\ y = \dfrac{Y}{(X+Y+Z)} \\ z = \dfrac{Z}{(X+Y+X)} = 1 - x - y \end{cases} \Rightarrow \begin{cases} X = Y\left(\dfrac{x}{y}\right) \\ Z = Y\left(\dfrac{z}{y}\right) \end{cases}. \quad \text{Equation 7}$$

It should be noted that since Y represents brightness and the brightness is not adjusted, the value of Y in the shift coordinate of the reference point is equal to the value of Y in the original coordinate of the reference point. According to the equation 7, the shift coordinate $(X\ Y\ Z)_{Shift}$ of the reference point is (0.830583 0.8860 1.052072).

According to the equations 4 and 5, the coordinate transformation matrix $M_T$ is $$\begin{pmatrix} 0.9980 & 0 & 0 \\ 0 & 1 & 0 \\ 0 & 0 & 0.9802 \end{pmatrix}.$$

Then, according to the equation 6, the color transformation matrix $M_C$ is $$\begin{pmatrix} 0.9976 & 0.0008 & -0.0004 \\ -0.0011 & 1.0006 & -0.0025 \\ 0.0082 & -0.0004 & 0.9801 \end{pmatrix}.$$

Then, the processing unit 14 may adjust three output percentages of RGB by the color transformation matrix $M_C$ according to an equation 8 below, so as to update the current color to be a new color adjusted by the user in real-time.

$$(rgb)_{Adjusted} = (rgb)_{Original} * M_C. \quad \text{Equation 8:}$$

In the equation 8, $(r\ g\ b)_{Adjusted}$ represents the output percentages of RGB adjusted by the color transformation matrix $M_C$. When $(r\ g\ b)_{Original}$ is (0.8 0.9 1), $(r\ g\ b)_{Adjusted}$ is (0.8053 0.9007 0.9775).

In another embodiment, it is assumed that the color coordinate (0.2981 0.3174) of the reference point is shifted to (0.3 0.32) by the aforesaid three-dimensional adjusting interface and the brightness of the reference point is adjusted to 95% by the aforesaid three-dimensional adjusting interface. Since Y represents brightness and the brightness is adjusted to 95%, the value of Y in the shift coordinate of the reference point is equal to the value of Y in the original coordinate of the reference point multiplied by 95%. According to the equation 7, the shift coordinate $(X\ Y\ Z)_{Shift}$ of the reference point is (0.789054 0.8417 0.999468).

According to the equations 4 and 5, the coordinate transformation matrix $M_T$ is $$\begin{pmatrix} 0.9481 & 0 & 0 \\ 0 & 0.95 & 0 \\ 0 & 0 & 0.9312 \end{pmatrix}.$$

Then, according to the equation 6, the color transformation matrix $M_C$ is $$\begin{pmatrix} 0.9477 & 0.0007 & -0.0004 \\ -0.0010 & 0.9506 & -0.0024 \\ 0.0078 & -0.0004 & 0.9311 \end{pmatrix}.$$

Then, the processing unit 14 may adjust three output percentages of RGB by the color transformation matrix $M_C$ according to an equation 8 below, so as to update the current color to be a new color adjusted by the user in real-time.

$$(rgb)_{Adjusted}=(rgb)_{Original}*M_C. \quad \text{Equation 8:}$$

In the equation 8, $(r\ g\ b)_{Adjusted}$ represents the output percentages of RGB adjusted by the color transformation matrix $M_C$. When $(r\ g\ b)_{Original}$ is (0.8 0.9 1), $(r\ g\ b)_{Adjusted}$ is (0.7650 0.8557 0.9286).

Figure 3:
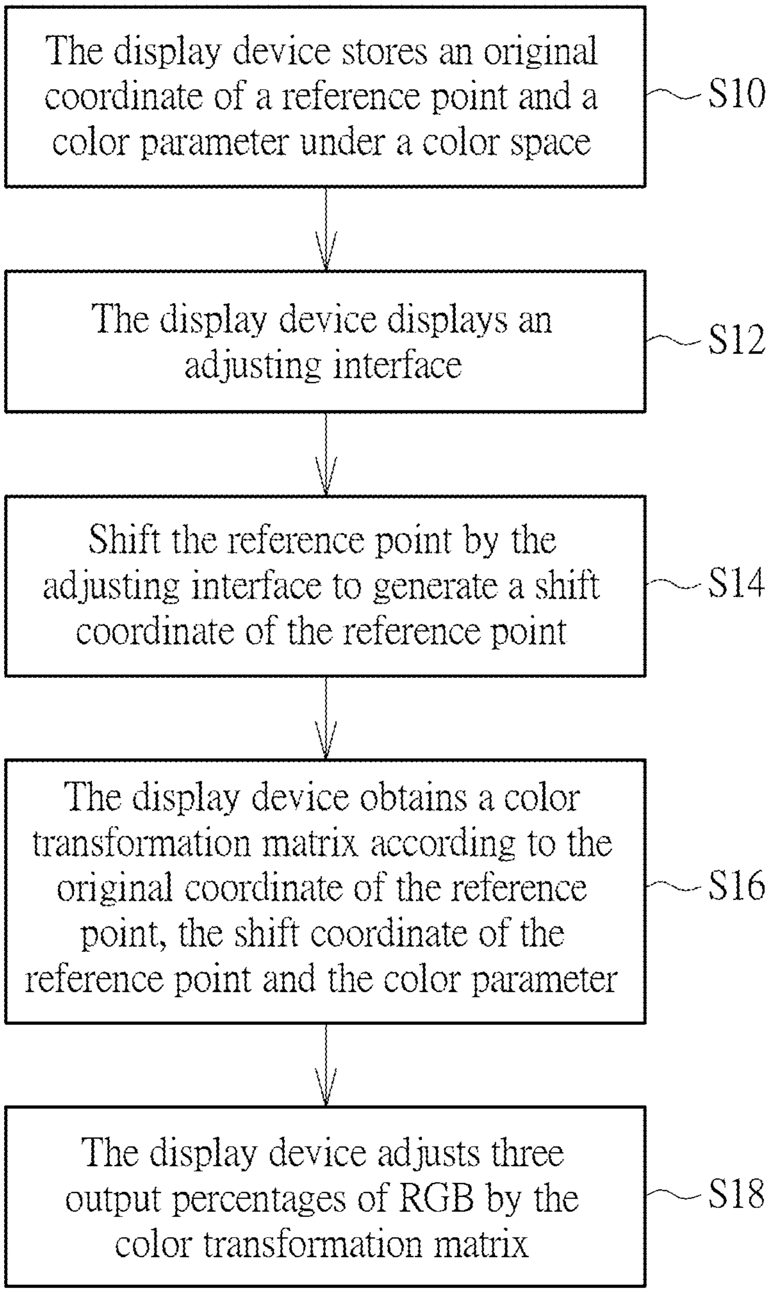
FIG. 3 is a flowchart illustrating a color adjusting method according to an embodiment of the invention.

Referring to FIG. 3, FIG. 3 is a flowchart illustrating a color adjusting method according to an embodiment of the invention. The color adjusting method shown in FIG. 3 is adapted to the aforesaid display device 1 shown in FIG. 1. First, step S10 is performed such that the display device 1 stores an original coordinate of a reference point and a color parameter under a color space, wherein the color space has been processed by color calibration in advance. Then, step S12 is performed such that the display device 1 displays an adjusting interface. Then, step S14 is performed to shift the reference point by the adjusting interface to generate a shift coordinate of the reference point. Then, step S16 is performed such that the display device 1 obtains a color transformation matrix according to the original coordinate of the reference point, the shift coordinate of the reference point and the color parameter. Then, step S18 is performed such that the display device 1 adjusts three output percentages of RGB by the color transformation matrix.

It should be noted that the detailed embodiments of the color adjusting method of the invention are mentioned in the above and those will not be depicted herein again. Furthermore, each part or function of the control logic of the color adjusting method of the invention may be implemented by software, hardware or the combination thereof.

As mentioned in the above, when a user wants to adjust the current color of the display device, the user shifts the reference point by the adjusting interface. Then, the display device calculates the color transformation matrix automatically and adjusts three output percentages of RGB by the color transformation matrix, so as to update the current color to be a new color adjusted by the user in real-time. Since the color transformation matrix does not need to be calculated by an external color analyzer, the invention is very convenient for a common user.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display device comprising:

a display unit displaying a reference point and an adjusting interface, wherein the adjusting interface comprises a plurality of input fields for a user to input shift vectors of the reference point;

a storage unit storing an original coordinate of the reference point and a color parameter of the display unit under a linear color space, the linear color space having been processed by color calibration in advance, and the color parameter being color coordinates of WRGB, wherein the adjusting interface, under control of the user, is configured to shift the reference point to generate a shift coordinate of the reference point according to the original coordinate of the reference point and the shift vectors;

the display device further comprising: a processing unit coupled to the storage unit and the display unit, the processing unit being configured to:

obtain an RGB tristimulus matrix according to the color coordinates of WRGB;

obtain a color transformation matrix according to the original coordinate of the reference point, the shift coordinate of the reference point and the RGB tristimulus matrix; and adjust three output brightness percentages of the obtained RGB tristimulus matrix by the color transformation matrix to update a current color of the display device to an adjusted color in real-time.

2. The display device of claim 1, wherein the adjusting interface is a two-dimensional adjusting interface or a three-dimensional adjusting interface.

3. The display device of claim 1, wherein the adjusting interface is a two-dimensional adjusting interface and the adjusting interface comprises a color adjusting template.

4. The display device of claim 1, wherein the adjusting interface is a three-dimensional adjusting interface and the adjusting interface comprises a color adjusting template and a brightness adjusting template.

5. The display device of claim 1, wherein the original coordinate of the reference point is obtained by an equation of:

$$(X\ Y\ Z)_{Original} = (r\ g\ b)_{Original} * \begin{pmatrix} R_X & R_Y & R_Z \\ G_X & G_Y & G_Z \\ B_X & B_Y & B_Z \end{pmatrix}_{Original};$$

Wherein $(X\ Y\ Z)_{Original}$, represents the original coordinate of the reference point, $(r\ g\ b)_{Original}$ represents three output brightness percentages of the obtained RGB tristimulus matrix of the reference point, and $$\begin{pmatrix} R_X & R_Y & R_z \\ G_X & G_Y & G_Z \\ B_X & B_Y & B_Z \end{pmatrix}_{Original}$$

represents the RGB tristimulus matrix.

6. The display device of claim 1, wherein the color transformation matrix is obtained by equations of:

$$(X\ Y\ Z)_{Shift} = (X\ Y\ Z)_{Original} * M_T;$$

$$M_T = \begin{pmatrix} X_{Shift}/X_{Originalt} & 0 & 0 \\ 0 & Y_{Shift}/Y_{Originalt} & 0 \\ 0 & 0 & Z_{Shift}/Z_{Originalt} \end{pmatrix}; \text{and}$$

$$M_C = \begin{pmatrix} R_X & R_Y & R_z \\ G_X & G_Y & G_Z \\ B_X & B_Y & B_Z \end{pmatrix}_{Original} * M_T * \begin{pmatrix} R_X & R_Y & R_z \\ G_X & G_Y & G_Z \\ B_X & B_Y & B_Z \end{pmatrix}^{-1}_{Original};$$

wherein $(X\ Y\ Z)_{Original}$, represents the original coordinate of the reference point, $(X\ Y\ Z)_{Shift}$ represents the shift coordinate of the reference point, $M_T$ represents a coordinate transformation matrix, $$\begin{pmatrix} R_X & R_Y & R_z \\ G_X & G_Y & G_Z \\ B_X & B_Y & B_Z \end{pmatrix}_{Original}$$

represents the RGB tristimulus matrix, and $M_C$ represents the color transformation matrix.

7. A color adjusting method adapted to a display device, the color adjusting method comprising:

the display device displaying a reference point and an adjusting interface and storing an original coordinate of the reference point and a color parameter of the display device under a linear color space, wherein the linear color space has been processed by color calibration in advance, the adjusting interface comprises a plurality of input fields for a user to input shift vectors of the reference point, and the color parameter is color coordinates of WRGB, wherein the adjusting interface, under control of the user, is configured to shift the reference point to generate a shift coordinate of the reference point according to the original coordinate of the reference point and the shift vectors;

the display device obtaining an RGB tristimulus matrix according to the color coordinates of WRGB and obtaining a color transformation matrix according to the original coordinate of the reference point, the shift coordinate of the reference point and the RGB tristimulus matrix; and the display device adjusting three output brightness percentages of the obtained RGB tristimulus matrix by the color transformation matrix to update a current color of the display device to an adjusted color in real-time.

8. The color adjusting method of claim 7, wherein the adjusting interface is a two-dimensional adjusting interface or a three-dimensional adjusting interface.

9. The color adjusting method of claim 7, wherein the adjusting interface is a two-dimensional adjusting interface and the adjusting interface comprises a color adjusting template.

10. The color adjusting method of claim 7, wherein the adjusting interface is a three-dimensional adjusting interface and the adjusting interface comprises a color adjusting template and a brightness adjusting template.

11. The color adjusting method of claim 7, wherein the original coordinate of the reference point is obtained by an equation of:

$$(X\ Y\ Z)_{Original} = (r\ g\ b)_{Original} * \begin{pmatrix} R_X & R_Y & R_z \\ G_X & G_Y & G_Z \\ B_X & B_Y & B_Z \end{pmatrix}_{Original};$$

Wherein $(X\ Y\ Z)_{Original}$, represents the original coordinate of the reference point, $(r\ g\ b)_{Original}$ represents three output brightness percentages of the obtained RGB tristimulus matrix of the reference point, and $$\begin{pmatrix} R_X & R_Y & R_z \\ G_X & G_Y & G_Z \\ B_X & B_Y & B_Z \end{pmatrix}_{Original}$$

represents the RGB tristimulus matrix.

12. The color adjusting method of claim 7, wherein the color transformation matrix is obtained by equations of:

$$(X\ Y\ Z)_{Shift} = (X\ Y\ Z)_{Original} * M_T;$$

$$M_T = \begin{pmatrix} X_{Shift}/X_{Originalt} & 0 & 0 \\ 0 & Y_{Shift}/Y_{Originalt} & 0 \\ 0 & 0 & Z_{Shift}/Z_{Originalt} \end{pmatrix}; \text{ and}$$

$$M_C = \begin{pmatrix} R_X & R_Y & R_z \\ G_X & G_Y & G_Z \\ B_X & B_Y & B_Z \end{pmatrix}_{Original} * M_T * \begin{pmatrix} R_X & R_Y & R_z \\ G_X & G_Y & G_Z \\ B_X & B_Y & B_Z \end{pmatrix}^{-1}_{Original};$$

wherein $(X\ Y\ Z)_{Original}$, represents the original coordinate of the reference point, $(X\ Y\ Z)_{Shift}$ represents the shift coordinate of the reference point, $M_T$ represents a coordinate transformation matrix, $$\begin{pmatrix} R_X & R_Y & R_z \\ G_X & G_Y & G_Z \\ B_X & B_Y & B_Z \end{pmatrix}_{Original}$$

represents the RGB tristimulus matrix, and $M_C$ represents the color transformation matrix.

* * * * *